United States Patent
Ruusunen et al.

(10) Patent No.: US 6,186,240 B1
(45) Date of Patent: Feb. 13, 2001

(54) METHOD FOR SHOEING A HORSE AND HORSESHOE NAIL

(75) Inventors: Jarkko Ruusunen, Kauttua; Risto Välimäki, Loimaa, both of (FI)

(73) Assignee: Tomanita Oy, Loiamaa (FI)

( * ) Notice: Under 35 U.S.C. 154(b), the term of this patent shall be extended for 0 days.

(21) Appl. No.: 09/214,391

(22) PCT Filed: Jul. 1, 1997

(86) PCT No.: PCT/FI97/00423

§ 371 Date: May 24, 1999

§ 102(e) Date: May 24, 1999

(87) PCT Pub. No.: WO98/01030

PCT Pub. Date: Jan. 15, 1998

(30) Foreign Application Priority Data

Jul. 3, 1996 (FI) .......................................... 962734

(51) Int. Cl.[7] .......................................... A01L 5/00
(52) U.S. Cl. .......................................... 168/23
(58) Field of Search .................... 411/447, 512, 411/900, 901, 908, 442, 446, 439; 168/23, 17, 4, DIG. 1

(56) References Cited

U.S. PATENT DOCUMENTS

| 245,211 | * | 1/1926 | Morgan ................................. 168/23 |
| 3,491,972 | * | 1/1970 | Townshend . |
| 3,915,299 | * | 10/1975 | Miyaoku ................................. 206/345 |
| 4,352,520 | * | 10/1982 | Stiglmaier et al. . |
| 4,592,481 | * | 6/1986 | Chen . |
| 4,826,381 | * | 5/1989 | Kiriyama ................................. 411/443 |
| 4,970,795 | * | 11/1990 | Woodward et al. . |
| 5,172,766 | * | 12/1992 | Adkins . |
| 5,498,188 | * | 3/1996 | Deahr . |
| 5,509,484 | * | 4/1996 | Landi et al. . |
| 5,533,575 | * | 7/1996 | Brown . |

FOREIGN PATENT DOCUMENTS

| 128810 | 2/1901 | (DE) . |
| 441249 | 3/1926 | (DE) . |
| 4027 | 10/1894 | (NO) . |
| 1684 | 9/1888 | (SE) . |
| 52541 | 11/1916 | (SE) . |

OTHER PUBLICATIONS

Explanation concerning the relevance of cited German Patents DE 441 249 and DE 128 810; Swedish Patents No. 52541 and 1684; and Norwegian Patent No. 4027.

* cited by examiner

*Primary Examiner*—Thomas Price
(74) *Attorney, Agent, or Firm*—Volpe & Koenig, P.C.

(57) ABSTRACT

A method of shoeing a horse using plastic nails. The nails are driven through a horse's hoof and the projecting plastic ends are secured.

4 Claims, 2 Drawing Sheets

METHOD FOR SHOEING A HORSE AND HORSESHOE NAIL

TECHNICAL FIELD

The present invention concerns a method for shoeing a horse in a way that the horseshoe is placed against the hoof of the horse and fixed into the hoof by hitting nails into the hoof through holes in the shoe so that the point of the nail protrudes from the side of the hoof The invention also concerns a horseshoe nail, comprising a shaft portion and a head portion, the diameter of which is bigger than the one of the shaft portion, and of a sharp point.

BACKGROUND ART

The design and technique of horseshoes and shoe nails have developed only a little. The basic technology has been the same throughout the history, the shoes and nails are in general of iron.

Nails of the horseshoes have always been made by forging or drawing of iron, nowadays mechanically. Due to the form of the nails, their production is slow and the price relatively high compared with wire nails made of the same material by drawing, used e.g. by the construction industry.

Attempts have been made to improve the industrial manufacturing process of the horseshoe nails e.g. by press cutting and other methods. The process of forging, however, provides the metal at the sharp point portion of the nail with hard but at the same time with required tensile characteristics. The nail is a sharp edged, thick headed spike narrowing evenly and with a length of about 4 to 6 cm. Evenly thick or round nails cannot be used as nails for horseshoes. The nail penetrating the hoof in the most preferable way must have the traditional form with a rectangular cross section.

When shoeing a horse, the nails are hit via the nail holes in the horseshoe through the keratin hoof of the horse so that the sharp point of the nail comes out from the side of the hoof. This visible part of the nail will be shortened by cutting, and bent downwards against the surface of the hoof. Thus, the nails form durable tight hooks fastening the shoe to the hoof of the horse. This procedure for securing and fastening the nail is called clenching.

Means, equipment, parts and methods made of materials of new technologies have been invented within other fields in order to develop these fields. Nothing essentially new has been developed for shoeing horses.

DISCLOSURE OF INVENTION

A method in accordance with the present invention is characterized in that plastic nails are used. The point of the nail can be softened by heating, and the nail locked to the hoof by spreading the point of the nail to provide a fixing portion supported against the surface of the hoof, the diameter of the fixing portion being bigger than that of the shaft of the nail and the hole made by the nail in the hoof. A horseshoe nail in accordance with the present invention is characterized in that the material of the nail is plastic.

Nails in accordance with the invention can be manufactured by fast modern industrial methods. Instead of clenching, the nails are fastened to the hoofs of the horse by means of heat riveting.

When using the method in accordance with the invention, the shortening and clenching of the nail can be eliminated when shoeing horses. The hoof of the horse is not broken, as it might be due to the bending force the nail is subjected to by clenching.

Many modern synthetic materials can be used for the nail in accordance with the invention. The material to be used must have the following characteristics:

1. Easily cast or cut, thus providing fast industrial manufacturing.
2. Hard, whereby the nail is shock-resistant and remains sharp and unbroken when penetrating the hoof of the horse.
3. High tensile strength, whereby the nail, when fitted, retains the shoe of the horse.
4. Sufficiently low softening point, so that it can be softened without damaging the hoof and locked against the hoof by spreading the point portion of the nail as a rivet against the hoof.

Materials fulfilling these requirements are thermoplastics like polypropylene, polyamide, thermoplastic polyesters and polyetherketon. Also reinforced plastic with continuous fibre reinforcement longitudinally to the nail, e.g. glass fibre, carbon fibre or aramide fibre, can serve as materials for the nail.

A plastic nail can adapt itself better than an iron nail to the nail slot in the horseshoe. The friction coefficient of a plastic nail is smaller than that of a steel nail, so that the plastic nail does not require equal force for penetrating the hoof when shoeing the horse. A plastic nail is lighter than a steel nail. Its heat conductivity is lower. A plastic nail is physiologically completely inert, that is, no substances hazardous to health are emitted by it.

A plastic nail can be produced of thermoplastic by a smelting process. Die-casting or s combined die-casting and extruding can be used as techniques. If necessary, the longitudinal characteristics of a plastic nail can be improved by orientating the nail which can be effected by stretching the nail.

Nail of different sizes can be made of plastics of different colours, thus making it easier to separate the different sized nails.

BRIEF DESCRIPTION OF THE DRAWINGS

The invention and its details will now be described in more details, with reference to the enclosed drawings, wherein.

EMBODIMENTS OF THE INVENTION

Figure 1:
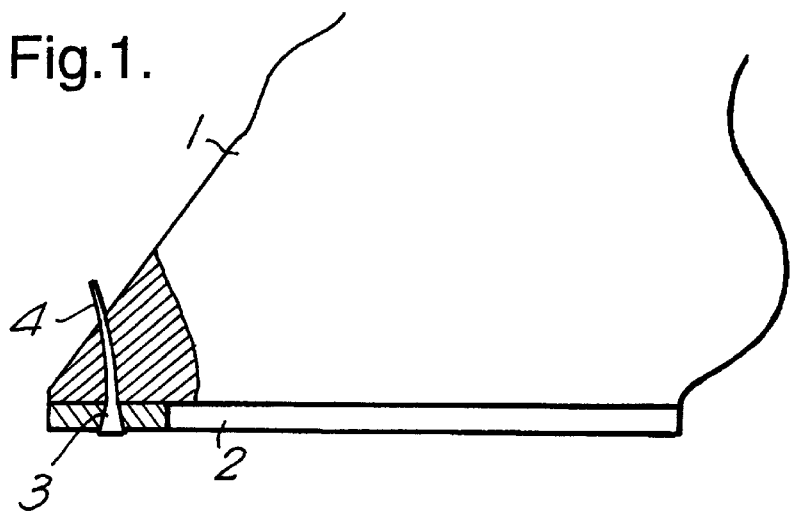
FIG. 1 shows a partly cut side view of a hoof of a horse and a horseshoe and one nail before riveting the point of the nail.
Figure 2:
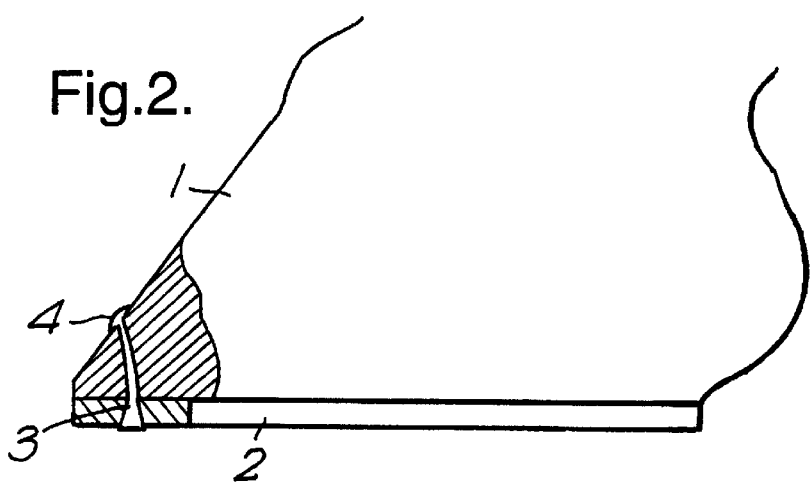
FIG. 2 shows the same after the riveting.

FIG. 1 shows a hoof 1 and a horseshoe 2. Material of the nail is plastic. The form of the nail is similar to that of a traditional iron nail. The traditional form guarantees the function of the nail in the shoeing situation.

A nail 3 has been hit through a hole in the shoe so that its point 4 comes out from the surface of the hoof. After that, the sharp point of the nail is heated, whereby it melts soft and deforming. The softened point, spread as a rivet, is pressed against the surface of the hoof, whereby it locks the nail in its place. A tool developed for this purpose is used for heating and spreading.

Figure 4:
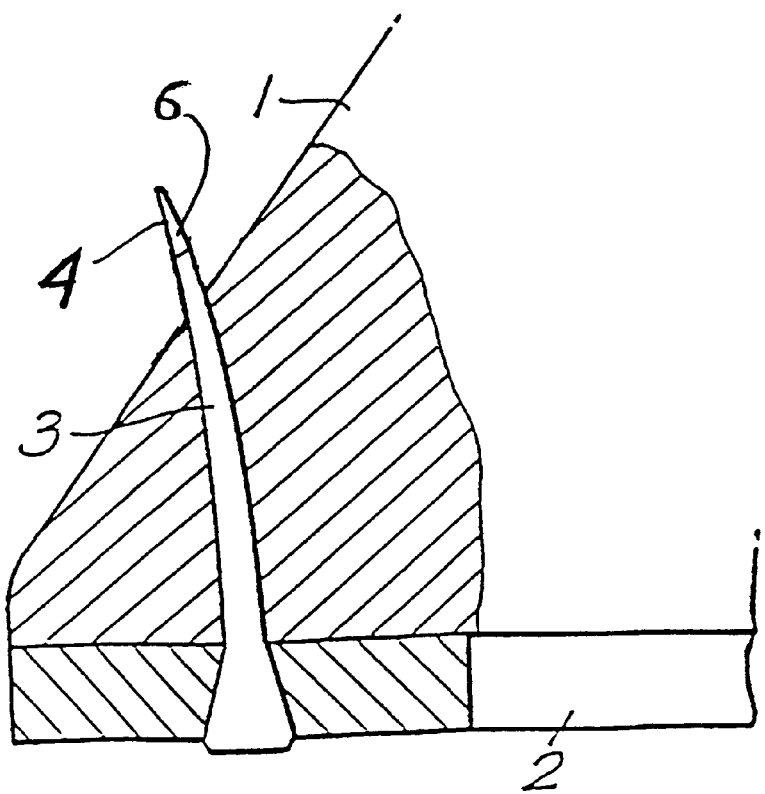
FIG. 4 shows an alternate embodiment of the nail.

The nail according to the invention can also be equipped with a metal bushing 6, as shown in FIG. 4, placed at its point. The sharp edged metal point ensures that the nail penetrates easily the hoof When the nail has been hit in its place, the metal point will be cut away. The plastic portion protruding from the hoof is melted and spread as a rivet.

Figure 3:
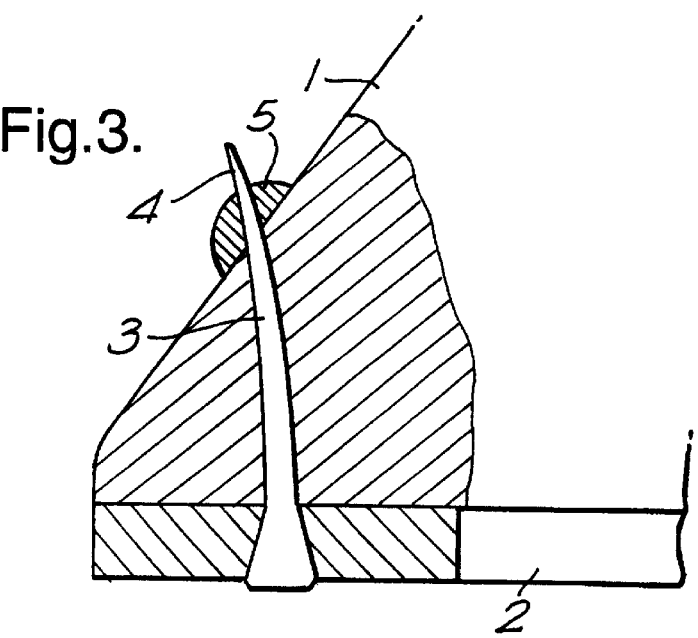
FIG. 3 shows an alternative embodiment of the nail.

Instead of melting, the nail can also be fastened at its point by glueing e.g. by means of a melt glue, or by means of a bayonet tack. This kind of an embodiment has been described in FIG. 3. The bayonet tack 5 is provided with nodules in the inner surface of its hole, catching to the nail. After the nail has been hit in its place, the nodule will be attached to it and the extra point portion 4 will be cut away.

This kind of a bayonet tack can be made of a plastic with different colour than the nail itself, thus providing more effects to the horse racing. This kind of a bayonet tack can be also made of a fluorescent plastic, so that the tacks are visible in the dark. Also this gives a new effect to the horse racing.

What is claimed is:

1. A method for shoeing a horse so that a horseshoe (2) is placed against the hoof (1) of the horse and fastened to the hoof by hitting nails (3) into the hoof through holes in the shoe so that the point (4) of the nail protrudes from the side of the hoof, wherein plastic nails are used and an auxiliary fastening means is applied to the protruding point of the plastic nail to lock the nail to the hoof.

2. A method for shoeing a horse so that a horseshoe (2) is placed against the hoof (1) of the horse and fastened to the hoof by hitting nails (3) into the hoof through holes in the shoe so that the point (4) of the nail protrudes from the side of the hoof wherein plastic nails are used and the point (4) of the nail is softened by means of heating, and the nail (3) is locked to the hoof (1) by spreading the point of the nail to form a fixing portion supported against the surface of the hoof, the diameter of said fixing portion being bigger than that of the shaft of the nail and of the hole made by the nail in the hoof.

3. The method in accordance with claim 1, wherein the nail (3) is locked to the hoof (1) by applying glue to the point (4) protruding from the hoof.

4. A method in accordance with claim 1, characterized in that the nail (3) is locked to the hoof (1) by attaching a bayonet tack (5) to its point.

* * * * *